United States Patent
Slomka et al.

(10) Patent No.: US 12,521,078 B2
(45) Date of Patent: Jan. 13, 2026

(54) SYSTEMS AND METHODS FOR THE ASSESSMENT OF CARDIAC AMYLOIDOSIS

(71) Applicant: CEDARS-SINAI MEDICAL CENTER, Los Angeles, CA (US)

(72) Inventors: Piotr Slomka, Los Angeles, CA (US); Sebastien Cadet, Los Angeles, CA (US); Paul Kavanagh, Santa Monica, CA (US); Tejas Parekh, San Gabriel, CA (US)

(73) Assignee: Cedars-Sinai Medical Center, Los Angeles, CA (US)

( * ) Notice: Subject to any disclaimer, the term of this patent is extended or adjusted under 35 U.S.C. 154(b) by 863 days.

(21) Appl. No.: 17/720,764

(22) Filed: Apr. 14, 2022

(65) Prior Publication Data

US 2022/0338828 A1    Oct. 27, 2022

Related U.S. Application Data

(60) Provisional application No. 63/175,816, filed on Apr. 16, 2021.

(51) Int. Cl.
*A61B 6/50*    (2024.01)
*A61B 6/00*    (2024.01)
(Continued)

(52) U.S. Cl.
CPC .............. *A61B 6/503* (2013.01); *A61B 6/032* (2013.01); *A61B 6/037* (2013.01); *A61B 6/469* (2013.01); *A61B 6/5217* (2013.01); *A61B 6/5235* (2013.01)

(58) Field of Classification Search
CPC ......... A61B 6/503; A61B 6/032; A61B 6/037; A61B 6/469; A61B 6/5217; A61B 6/5235; A61B 6/481
See application file for complete search history.

(56) References Cited

U.S. PATENT DOCUMENTS

2023/0260173 A1*  8/2023  Feng .................... A61B 5/0037
                                                       382/131

OTHER PUBLICATIONS

Miller RJH, Cadet S, Mah D, Pournazari P, Chan D, Fine NM, Berman DS, Slomka PJ. Diagnostic and prognostic value of Technetium-99m pyrophosphate uptake quantitation for transthyretin cardiac amyloidosis. J Nucl Cardiol. Oct. 2021;28(5):1835-1845. doi: 10.1007/s12350-021-02563-4. Epub Mar. 10, 2021 (Year: 2021).*

(Continued)

*Primary Examiner* — Pascal M Bui Pho
*Assistant Examiner* — Michael Yiming Fang
(74) *Attorney, Agent, or Firm* — NIXON PEABODY LLP

(57) ABSTRACT

Assessment of transthyretin amyloid cardiomyopathy (ATTR-CM) can be performed by calculating a cardiac pyrophosphate activity (CPA) measurement from single-photon emission computed tomography (SPECT) images. SPECT images obtained using $^{99m}$Technetium-pyrophosphate as a radiotracer can be analyzed to calculate CPA. Scan-specific thresholds for abnormal myocardial activity are identified based on left ventricular blood pool (LVBP) radiotracer counts, then radiotracer activity in regions of the myocardium with abnormal myocardial activity is determined. Finally, a CPA measurement can be calculated as a function of the mean radiotracer counts in such regions over the maximal LVBP radiotracer activity multiplied by the volume of involvement (e.g., the volume of abnormal activity). This CPA measurement can then be used as an assessment of ATTR-CM.

20 Claims, 11 Drawing Sheets

(51) Int. Cl.
   A61B 6/03      (2006.01)
   A61B 6/46      (2024.01)

(56) References Cited

OTHER PUBLICATIONS

Bokhari S, Castaño A, Pozniakoff T, Deslisle S, Latif F, Maurer MS. (99m)Tc-pyrophosphate scintigraphy for differentiating light-chain cardiac amyloidosis from the transthyretin-related familial and senile cardiac amyloidoses. Circ Cardiovasc Imaging. Mar. 1, 2013;6(2):195-201. doi: 10.1161/CIRCIMAGING (Year: 2013).*
Ruberg FL, Grogan M, Hanna M, Kelly JW, Maurer MS. Transthyretin Amyloid Cardiomyopathy: JACC State-of-the-Art Review. J Am Coll Cardiol. Jun. 11, 2019;73(22):2872-2891. doi: 10.1016/j.jacc.2019.04.003. PMID: 31171094; PMCID: PMC6724183 (Year: 2019).*
Georgoulias, Panagiotis & Angelidis, George & Zissimopoulos, Athanasios & Tsougos, Ioannis. (2016). Myocardial Perfusion (SPECT) Imaging: Radiotracers and Techniques. 10.2174/9781681083773116020007. (Year: 2016).*

* cited by examiner

SYSTEMS AND METHODS FOR THE ASSESSMENT OF CARDIAC AMYLOIDOSIS

CROSS REFERENCE TO RELATED APPLICATIONS

The present application claims the benefit of U.S. Provisional Application No. 63/175,816, filed Apr. 16, 2021 and entitled "SYSTEMS AND METHODS FOR THE ASSESSMENT OF CARDIAC AMYLOIDOSIS," which is hereby incorporated by reference in its entirety.

STATEMENT REGARDING FEDERALLY SPONSORED RESEARCH OR DEVELOPMENT

This invention was made with government support under Grant No. HL135557 awarded by National Institutes of Health. The government has certain rights in the invention.

TECHNICAL FIELD

The present disclosure relates to nuclear cardiology generally and more specifically to systems and methods for obtaining and interpreting diagnostic information of cardiac amyloidosis.

BACKGROUND

Transthyretin amyloid cardiomyopathy (ATTR-CM) is an increasingly recognized cause of heart failure related to the build-up of amyloid plaques in the heart muscle. If left untreated, ATTR-CM can cause substantial, and sometimes fatal, heart problems. Diagnosis of ATTR-CM relies on a high clinical suspicion for the disease in combination with analysis of biopsied tissue or cardiac imaging, such as echocardiography, cardiac magnetic resonance imaging, and nuclear cardiology imaging.

$^{99m}$Technetium-pyrophosphate ($^{99m}$TC-PYP) imaging has emerged as a highly sensitive and specific tool for diagnosing ATTR-CM. Initial techniques relied on a qualitative assessment of cardiac uptake relative to rib uptake. For example, one approach for diagnosing ATTR-CM is to calculate a Perugini score. The Perugini score is determined by comparing cardiac radiotracer activity to rib radiotracer activity on a scale of 0 (e.g., no uptake) to 3 (e.g., cardiac update is greater than bone).

Subsequent techniques have shown that heart to contralateral lung (H/CL) ratio on planar imaging may show improved diagnostic accuracy compared to qualitative assessment. To determine the H/CL ratio, a count of radiotracer activity in a region of interest over the heart is divided by the background counts in an identically sized region of interest over the contralateral chest. H/CL ratios at or greater than 1.5 is generally classified as ATTR positive.

While current imaging techniques are useful for generally diagnosing ATTR-CM, there is a need for more accurate and efficient systems and methods for interpreting cardiac images in the diagnosis of ATTR-CM.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a method comprising receiving imaging data of a heart. The imaging data being indicative of radiotracer uptake in tissue. The method further comprises determining an abnormal myocardial activity threshold using the imaging data. The method further comprises identifying a myocardium region of interest in the imaging data. The method further comprises identifying one or more regions of abnormal myocardial activity within the myocardium region of interest, wherein each of the one or more regions of abnormal myocardial activity has radiotracer activity greater than the abnormal myocardial activity threshold. The method further comprises determining a volume of involvement associated with the identified one or more regions of abnormal myocardial activity. The method further comprises calculating a mean radiotracer activity count for the one or more regions of abnormal myocardial activity. The method further comprises calculating a cardiac pyrophosphate activity value using the volume of involvement and the mean radiotracer activity count.

In some cases, the radiotracer is $^{99m}$Technetium-pyrophosphate and the imaging data is acquired from a single-photon emission computed tomography scanner. In some cases, determining the abnormal myocardial activity threshold includes: identifying a left ventricular blood pool region of interest (LVBP-ROI) in the imaging data; identifying a maximal radiotracer count within the LVBP-ROI; and calculating the abnormal myocardial activity threshold using the maximal radiotracer count within the LVBP-ROI. In some cases, calculating the abnormal myocardial activity threshold using the maximal radiotracer count within the left ventricular blood pool region of interest includes calculating the abnormal myocardial activity threshold as a percentage of the maximal radiotracer count within the left ventricular blood pool region of interest, wherein the percentage is between 125% and 175%. In some cases, the percentage is at or approximately 150%. In some cases, calculating the cardiac pyrophosphate activity value further uses the maximal radiotracer count within the left ventricular blood pool region of interest. In some cases, the cardiac pyrophosphate activity value (CPA) is calculated using the equation mean radiotracer activity count $$CPA = \text{Volume of Involvement} \times \frac{\text{mean radiotracer activity count}}{\text{maximal radiotracer count within the } LVBP\text{-}ROI}.$$

In some cases, the method further includes: presenting the imaging data on a display device; and presenting the cardiac pyrophosphate activity value on the display device in association with the imaging data, wherein the cardiac pyrophosphate activity value is usable to assess a risk of ATTR-CM.

Embodiments of the present disclosure include a system comprising one or more data processor and a non-transitory computer-readable storage medium containing instructions which, when executed on the one or more data processors, cause the one or more data processors to perform the method described above.

Embodiments of the present disclosure include a computer-program product tangibly embodied in a non-transitory machine-readable storage medium, including instructions configured to cause a data processing apparatus to perform the method described above.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
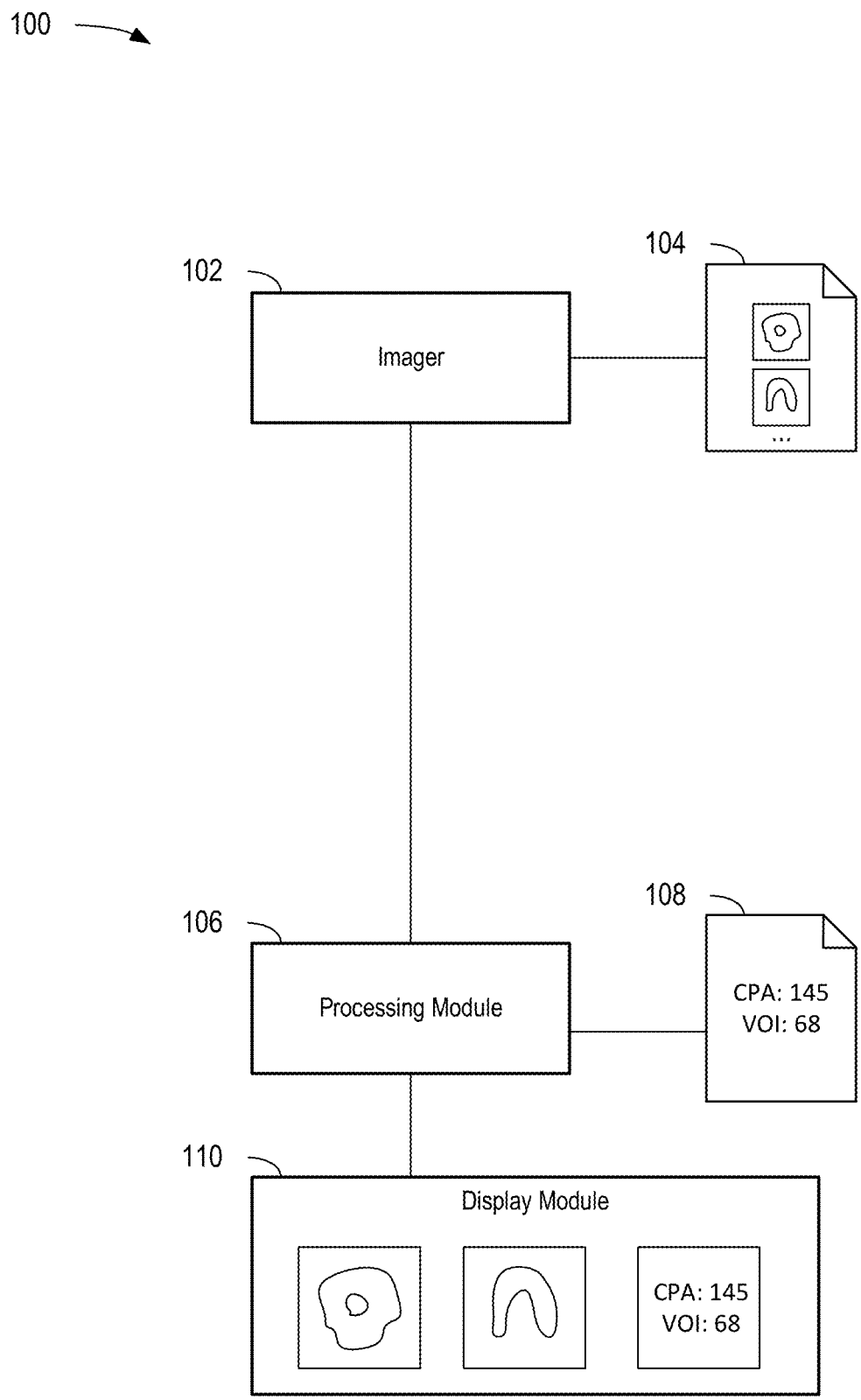
FIG. 1 is a schematic diagram depicting a computing environment for acquiring and processing imaging data, according to certain aspects of the present disclosure.

Certain aspects and features of the present disclosure relate to assessing Transthyretin amyloid cardiomyopathy (ATTR-CM) by calculating a cardiac pyrophosphate activity (CPA) measurement from single-photon emission computed tomography (SPECT) images. SPECT images obtained using $^{99m}$Technetium-pyrophosphate ($^{99m}$TC-PYP) as a radiotracer can be analyzed to calculate CPA. Scan-specific thresholds for abnormal myocardial activity are identified based on left ventricular blood pool (LVBP) radiotracer counts, then radiotracer activity in regions of the myocardium with abnormal myocardial activity is determined. Finally, a CPA measurement can be calculated as a function of the mean radiotracer counts in such regions over the maximal LVBP radiotracer activity multiplied by the volume of involvement (e.g., volume of abnormal activity). This CPA measurement can then be used as an assessment of ATTR-CM.

The reliance on measurement of H/CL ratio in current radiographic techniques for diagnosing ATTR-CM is flawed, since the H/CL ratio is influenced by regional rib radiotracer uptake, which may not be uniform, as well as radiotracer retention in the left ventricular blood pool (LVBP). Thus, it can be difficult to accurately assess ATTR-CM using such techniques.

Certain aspects and features of the present disclosure leverage radiotracer activity measured in the left ventricular blood pool (LVBP) to define a threshold level of activity. This threshold level can be used to identify abnormal myocardial activity in the myocardial region of interest, thus permitting direct quantification of the myocardial region of interest without needing to rely on rib radiotracer activity. Directly quantifying abnormal myocardial radiotracer activity can provide closer associations with disease burden and clinical outcomes, resulting in improved diagnostic ability. This direct quantification can include i) identifying a volume of involvement (VOI) exhibiting radiotracer activity above the established abnormal myocardial activity threshold; and ii) calculating a CPA value using the VOI and measurements (e.g., means) of radiotracer activity in the VOI.

Such direct, quantitative assessment of myocardial radiotracer activity with CPA or VOI had high diagnostic accuracy for ATTR-CM. The inter-observer variability in quantifying CPA and VOI were lower compared to H/CL ratio, and there was excellent agreement regarding the presence of absence of activity. Additionally, significant correlations were found between direct quantitation of myocardial radiotracer uptake and ventricular morphology, as well as associations with the incidence of heart failure hospitalization. Quantitative assessment of $^{99m}$Tc-pyrophosphate uptake may have an important clinical role as a non-invasive marker in patients with ATTR-CM to follow progression of disease or response to medical therapy.

Direct myocardial quantification also has theoretical benefits compared to existing methods. Qualitative scoring systems and indirect quantitation of myocardial activity are influenced by regional difference in rib uptake and LVBP activity. Direct myocardial radiotracer quantitation, with CPA or VOI, accounts for these sources of error by excluding rib activity from regions of interest and using LVBP activity to determine thresholds for abnormal activity. While visual differentiation of LVBP from myocardial radiotracer activity on SPECT images may be able to account for these sources of error, visual differentiation cannot provide the reproducible, quantitative metric of disease burden. Thus, CPA and/or VOI may have a significant role as a marker of disease burden. Importantly, there was uniform agreement on the presence of absence of abnormal activity using direct myocardial quantification. Reducing interpretation variability is potentially more important for centers with less expertise in evaluating $^{99m}$Tc-pyrophosphate studies. Regardless, recent myocardial infarction will impact all methods for interpretation and evaluation of uptake pattern is important to ensure high diagnostic accuracy.

To evaluate the efficacy of CPA, a study was conducted on 124 patients, with a mean age 73.9±11.4 and 94 (73.4%) male. ATTR-CM was diagnosed in 43 (34.7%) patients. Patients with ATTR-CM were older (mean age 79.3 vs 70.6, P<0.001)) and less likely to have diabetes (9.1% vs. 25.0%, p=0.035). Patients with ATTR-CM had a similar mean LVEF to patients without (49.0 vs 52.5, p=0.101), but higher prevalence of at least moderately increased wall thickness (63.6% vs 22.5%, p<0.001).

Baseline population characteristics and a comparison of pyrophosphate imaging parameters are shown in Table 1. CPA and volume of involvement (VOI) values were determined as described in further detail herein. Continuous variables are displayed as a mean±its standard deviation, categorical variables are displayed as number(proportion). SPECT visual positive represents the number of patients where a medical professional concluded that ATTR-CM would be present based on visual inspection of the SPECT image data.

TABLE 1

Baseline Population Characteristics

|  | No ATTR-CM (n = 81) | ATTR-CM (n = 43) | p-value |
|---|---|---|---|
| Clinical Characteristics |  |  |  |
| Age (years) | 70.6 ± 11.6 | 79.3 ± 8.6 | <0.001 |
| Male | 56(69.1) | 36(83.7) | 0.088 |
| Hypertension | 37(45.7) | 26(60.4) | 0.134 |
| Diabetes | 20(24.7) | 4(9.3) | 0.055 |
| Dyslipidemia | 12(14.8) | 13(30.2) | 0.059 |
| Left Ventricular Ejection Fraction (LVEF) | 52.6 ± 11.8 | 48.8 ± 10.4 | 0.101 |
| ≥Moderate increased wall thickness | 18(22.2) | 28(65.1) | <0.001 |
| Pyrophosphate imaging |  |  |  |
| Clinical interpretation positive | 2(2.5) | 38(88.4) | <0.001 |
| Perugini score 2/3 | 7(8.6) | 40(93.0) | <0.001 |
| H/CL ratio | 1.18 ± 0.14 | 1.72 ± 0.25 | <0.001 |
| SPECT visual positive | 1(1.2) | 43(100.0) | <0.001 |
| CPA | 3 ± 24 | 409 ± 339 | <0.001 |
| VOI | 2 ± 14 | 225 ± 140 | <0.001 |

The data from Table 1 shows a strong association between the CPA value and the diagnosis of ATTR-CM.

In patients with ATTR-CM, there was no correlation between H/CL ratio (r=0.129, p=0.405) or Perugini score (r=0.263, p=0.085) and left ventricular ejection fraction (LVEF). There was moderate correlation between CPA and LVEF (r=−0.420, p=0.005). Unadjusted and adjusted associations with reduced LVEF and moderate or greater increased wall thickness are shown in Table 2, below. Adjustments are for age, sex, and history of hypertension, with each $^{99m}$Tc-pyrophosphate parameter assessed separately. Reduced LVEF is defined as values <50%. "CI" is the confidence interval and "OR" is the odds ratio.

TABLE 2

Ventricular Morphology

|  | Unadjusted OR (95% CI) | p-value | Adjusted OR (95% CI) | p-value |
|---|---|---|---|---|
| Reduced LVEF (<50%) |  |  |  |  |
| Clinical interpretation positive | 1.58(0.24-10.5) | 0.637 | 1.17(0.15-9.03) | 0.879 |
| Perugini score | 3.59(1.07-12.0) | 0.039 | 3.12(0.89-11.0) | 0.076 |
| H/CL ratio | 2.23(0.20-24.5) | 0.510 | 1.96(0.15-25.0) | 0.604 |
| CPA (per 100 units*mm³) | 1.09(1.02-1.18) | 0.017 | 1.28(1.02-1.61) | 0.035 |
| VOI (per 100 mm³) | 1.59(1.20-2.11) | 0.001 | 1.59(1.17-2.16) | 0.003 |
| ≥Moderate Increased Wall Thickness |  |  |  |  |
| Clinical interpretation positive | 1.19(0.18-8.0) | 0.858 | 2.02(0.24-16.9) | 0.516 |
| Perugini score | 2.73(0.95-7.86) | 0.063 | 3.06(0.97-9.61) | 0.056 |
| H/CL ratio | 9.56(0.57-160) | 0.116 | 11.9(0.56-255) | 0.112 |
| CPA (per 100 units*mm³) | 1.15(1.04-1.26) | 0.005 | 1.64(1.16-2.31) | 0.005 |
| VOI (per 100 mm³) | 2.25(1.58-3.19) | <0.001 | 2.57(1.72-3.85) | <0.001 |

The data from Table 2 shows strong associations between the CPA value and certain ventricular morphologies (e.g., the presence of reduced LVEF and moderate or greater increased wall thickness). Higher CPA was associated with moderate or greater increased wall thickness after adjustment for age, sex, and history of hypertension (adjusted OR 1.64 per 100 units*mm³, 95% CI 1.16-2.31, p=0.005). Similar results were seen for VOI. Neither Perugini score (adjusted OR 3.06, p=0.056), nor H/CL ratio (adjusted OR 11.9, p=0.112), were associated with the presence of at least moderately increased wall thickness. Higher CPA was also associated with an increased likelihood of reduced LVEF (defined as LVEF<50%, adjusted odds ratio [OR] 1.28 per 100 units*mm³, 95% CI 1.02-1.62, p=0.035). Similar results were seen with VOI. Neither Perugini score (adjusted OR 3.12, p=0.076), nor H/CL ratio (adjusted OR 1.96, p=0.604), were associated with the presence of reduced LVEF.

During a median follow-up time of 1.2 years, 10 (18.2%) patients with ATTR-CM experienced cardiovascular mortality and 14 (31.8%) were admitted for decompensated heart failure (HF). Unadjusted and adjusted associations with the composite clinical outcome of heart failure hospitalization or all-cause mortality are shown in Table 3, below. Adjustments are for age, sex, and history of hypertension, with each $^{99m}$Tc-pyrophosphate parameter assessed separately. "CI" is the confidence interval and "HR" is the hazard ratio.

TABLE 3

Clinical Outcomes

|  | Unadjusted HR (95% CI) | p-value | Adjusted HR (95% CI) | p-value |
|---|---|---|---|---|
| Cardiovascular Death or HF hospitalization |  |  |  |  |
| Clinical interpretation positive | 0.60(0.17-2.16) | 0.439 | 0.67(0.18-2.49) | 0.548 |
| Perugini score | 1.10(0.50-2.40) | 0.816 | 1.02(0.45-2.32) | 0.957 |
| H/CL Ratio | 1.57(0.23-10.9) | 0.649 | 2.45(0.31-19.3) | 0.396 |
| CPA (per 100 units*mm³) | 1.13(0.96-1.34) | 0.137 | 1.17(0.98-1.38) | 0.076 |
| VOI (per 100 mm³) | 1.22(0.80-1.85) | 0.350 | 1.31(0.85-2.00) | 0.219 |
| Cardiovascular Death |  |  |  |  |
| Clinical interpretation positive | 0.33(0.06-1.80) | 0.199 | 0.14(0.02-1.15) | 0.068 |
| Perugini score | 0.45(0.18-1.13) | 0.088 | 0.31(0.09-1.01) | 0.061 |
| H/CL Ratio | 0.25(0.01-6.96) | 0.417 | 0.25(0.01-8.82) | 0.350 |

TABLE 3-continued

Clinical Outcomes

| | Unadjusted HR (95% CI) | p-value | Adjusted HR (95% CI) | p-value |
|---|---|---|---|---|
| CPA (per 100 units*mm$^3$) | 0.93(0.71-1.21) | 0.592 | 0.99(0.79-1.24) | 0.921 |
| VOI (per 100 mm$^3$) | 0.93(0.67-1.28) | 0.648 | 0.98(0.66-1.44) | 0.900 |
| HF Hospitalization | | | | |
| Clinical interpretation positive | 1.19(0.18-8.0) | 0.858 | 1.86(0.22-15.6) | 0.568 |
| Perugini score | 2.73(0.95-7.86) | 0.063 | 3.30(1.05-10.3) | 0.041 |
| H/CL Ratio | 9.56(0.57-160) | 0.116 | 14.8(0.67-330) | 0.088 |
| CPA (per 100 units*mm$^3$) | 1.26(1.06-1.51) | 0.010 | 1.29(1.08-1.55) | 0.006 |
| VOI (per 100 mm$^3$) | 1.58(1.00-2.50) | 0.050 | 1.81(1.09-3.00) | 0.022 |

The data from Table 3 shows that CPA was not associated with an increased risk of the combined outcome of cardiovascular death or admission for heart failure (adjusted HR per 100 unit increase 1.17, 95% CI 0.98-1.38, p=0.076) after adjusting for age, sex, and LVEF. However, CPA (adjusted HR per 100 unit increase 1.29, p=0.001) and VOI (adjusted HR per 100 mm$^3$ 1.81, p<0.001) were associated with HF hospitalization. Clinical interpretation, Perugini score, and H/CL ratio were not associated with the composite clinical outcome or its components. In patients not receiving targeted ATTR-CM therapies, CPA was significantly associated with the composite outcome (adjusted HR per 100 unit increase 1.28, 95% CI 1.05-1.56, p=0.014).

There has been mixed evidence for the prognostic utility of $^{99m}$Tc-pyrophosphate imaging. Some studies have identified no association or limited association between Perugini score or H/CL ratio and cardiovascular events in patients with ATTR-CM. However, CPA and VOI values, as determined according to certain aspects and features of the present disclosure, show significant associations with heart failure hospitalizations after adjusting for age, sex, and LVEF. Additionally, in patients not receiving targeted ATTR-CM therapies, CPA is associated with the composite outcome of heart failure hospitalization or cardiovascular mortality.

The importance of accurate diagnosis of ATTR-CM is driven by the evolving therapeutic options for patients with the disease, with increasing use of $^{99m}$Tc-pyrophosphate imaging. While the classical therapy for this condition was liver transplantation, recent studies have demonstrated the utility of medical therapies aimed at stabilizing misfolded transthyretin precursors. In an example trial, treatment with Tafamadis significantly reduced the incidence of all-cause mortality and cardiovascular hospitalization compared to placebo in patients with ATTR-CM. Patisiran improved echocardiographic parameters and decreased a combined end-point of all-cause mortality or cardiovascular hospitalization compared to placebo. While these drugs have clearly demonstrated benefit, given the associated costs it is important to accurately identify which patients should be considered for therapy. Methods to quantify disease burden such as quantification with CPA or VOI, could potentially help select patients who benefit most from targeted therapies or be used to monitor the efficacy of therapy.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting a computing environment 100 for acquiring and processing imaging data, according to certain aspects of the present disclosure. The computing environment 100 can include a scanner 102, a processing module 106, and a display module 110. The scanner 102, processing module 106, and display module 110 can be incorporated into a single housing or split into any number of housings, whether physically coupled together or not. The scanner 102, processing module 106, and display module 110 can be located in a shared location (e.g., a room, suite, facility, or building) or in different locations. In some cases, the scanner 102 can be located in a first location and the processing module 106 and display module 110 can be located in a separate, second location. For example, the scanner 102 can be a gamma camera located in a medical imaging facility and the processing module 106 and display module 110 can be a physician's computer workstation (e.g., the processor and display of the computer workstation) in the physician's office that is located in a separate facility, separate city, or even separate county as the medical imaging facility. Other combinations can occur.

The scanner 102 can be any suitable imaging device for generating nuclear imaging data 104 of cardiac organs. According to certain aspects and features of the present disclosure, the scanner 102 is a SPECT scanner that acquires imaging data 104 in the form of SPECT images. The scanner 102 can include a detector (e.g., a camera, such as a gamma camera) and any other components usable to generate and/or transmit the imaging data 104 from the data acquired by the detector. The scanner 102 can be used to detect emissions from a radiotracer, such as $^{99m}$TC-PYP. The radiotracer can be injected into a patient at a set time before imaging, permitting tissue in the patient to uptake the radiotracer, causing that tissue to emit electromagnetic radiation in the form of gamma rays in amounts proportional to the amount of uptake of the radiotracer. Certain tissue, such as bone and amyloid deposits, can uptake certain radiotracers, such as $^{99m}$TC-PYP, at different rates than surrounding tissue.

The scanner 102 can be communicatively coupled to the processing module 106 and/or the display module 110 via any suitable technique, such as wired or wireless connections, including direct connections or networked connections. In some cases scanner 102 can be coupled to processing module 106 via a network, such as a local area network, a wide area network, a cloud network, or the Internet. In some cases, data transfer between the scanner 102 and the processing module 106 can occur via removable physical media, such as compact disks or flash drives.

The imaging data 104 can be stored and/or transferred in any suitable format. In some cases, the imaging data 104 can be stored and/or displayed as two-dimensional or three-dimensional images. In some cases, the imaging data 104 can be stored as a collection of data points or voxels.

The processing module 106 can be any suitable computing device for processing the imaging data 104 as disclosed herein. The processing module 106 can receive the imaging data 104 and analyze the imaging data 104 to generate output data 108. The output data 108 can include a CPA value, a volume of involvement (VOI) value, and/or other usable values.

In some cases, the processing module 106 can include an input device, such as a computer mouse, keyboard, touchscreen, or the like. The input device can allow a user (e.g., a physician or other medical professional) to interact with the imaging data 104 and control generation of the output data 108. In some cases, input from a user may be used to establish regions of interest that will be used to generate the output data 108. In some cases, the processing module 106 can include the display module 110 for displaying imaging data 104 and/or output data 108. In some cases, the display module 110 is used in conjunction with or includes an input device.

The output data 108, once generated, can be presented on the display module 110 or otherwise presented to a user or patient. The output data 108, especially a CPA value, can be usable to assess and/or diagnose ATTR-CM.

Figure 2:
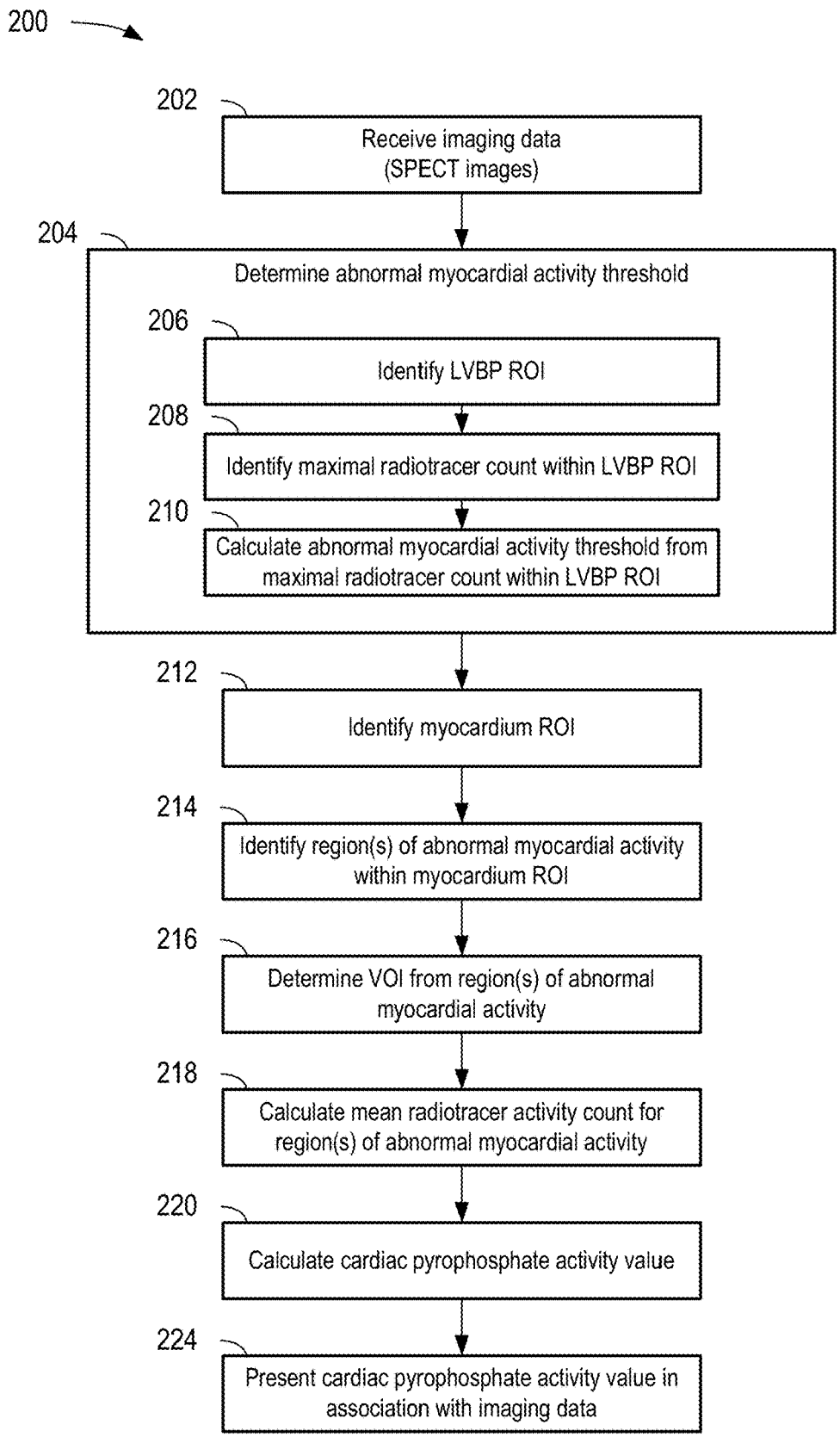
FIG. 2 is flowchart depicting a process for processing imaging data, according to certain aspects of the present disclosure.

FIG. 2 is flowchart depicting a process 200 for processing imaging data, according to certain aspects of the present disclosure. Process 200 can be used by processing module 106 of FIG. 1 to process imaging data 102 of FIG. 1.

At block 202, imaging data is received. The imaging data can include SPECT images in any suitable form. The imaging data can be collected by a SPECT scanner, such as a scanner equipped with a gamma detector or gamma camera. The imaging data can be collected of a patient at a given time after injection of a suitable radiotracer (e.g., $^{99m}$TC-PYP), such as 1 hour or 3 hours. The imaging data can include three-dimensional data indicative of amount of radiotracer activity per voxel in the imaged region. The imaged region can include most or all of the cardiac tissue.

The imaging data can be acquired according to various protocols. In an example, imaging with $^{99m}$TC-PYP can include injecting the patients with 740 to 770 MBq (20 to 21 mCi) of $^{99m}$TC-PYP intravenously and performing imaging scans at approximately 1-hour and 3-hours post injection using any suitable duration (e.g., 5-8 minutes). Depending on the scanner used, tomogram images can be acquired over various acquisition times (e.g., 12-15 minutes) using a low-energy high-resolution collimator, an energy window of at or approximately 10%, and a matrix size of 64×64. The images can be reconstructed using filtered back projection. In some cases, alterations to these protocols can be made, such as using a smaller or larger matrix sized, different times between injection and imaging, and different scanning durations.

In some cases, receiving the imaging data at block 202 can include receiving the imaging data using a physical medium, such as a compact disc or a removable flash drive. In some cases, receiving the imaging data at block 202 can include receiving the imaging data via a network interface, such as a network interface coupled to the source of the image data (e.g., a scanner or an image data storage device) via a local area network or via the Internet.

At block 204, an abnormal myocardial activity threshold is determined. The abnormal myocardial activity threshold is a value of radiotracer activity above which the myocardial radiotracer activity is to be considered "abnormal." The abnormal myocardial activity threshold can be determined in various fashions. As described in further herein, the abnormal myocardial activity threshold can be calculated based on radiotracer count in the LVBP. In some cases, however, the abnormal myocardial activity threshold can be a preset value received from memory, can be obtained by applying demographic information to a lookup table, can be obtained by applying imaging-data-derived information to a lookup table, or can otherwise be obtained.

When the abnormal myocardial activity threshold is obtained based on the radiotracer count in the LVBP, a LVBP region of interest (LVBP-ROI) can be identified at block 206. Identifying the LVBP-ROI can include manually or automatically defining a spherical region of interest in the center or approximate center of the LVBP. Manually defining the region can include placing and moving the region using a user interface, such as using a keyboard and/or mouse. Automatically defining the spherical region of interest can include automatically detecting, using the imaging data, estimated boundaries for the LVBP and placing the LVBP-ROI within those boundaries. The size of the LVBP-ROI can be any suitable size, such as at or approximately 10 mm. In some cases, a LVBP-ROI can be non-spherical in shape. In some cases, the LVBP-ROI can have a shape that is approximately the same as or slightly smaller than the estimated boundaries for the LVBP. In some cases, automatically defining the LVBP-ROI can include identifying a region of at least a threshold size (e.g., 5, 6, 7, 8, 9, or 10 mm) that has relatively consistent radiotracer activity and that is located in a region suspected or expected to be the LVBP. In some cases, automatically defining the LVBP-ROI can include processing the imaging data using a machine-learning algorithm trained to identify the LVBP-ROI (e.g., a LVBP-ROI most useful in generating a CPA value that is useful for diagnosing ATTR-CM).

Once the LVBP-ROI is identified at block 206, the maximal radiotracer count within the LVBP-ROI can be identified at block 208. Identifying the maximal radiotracer count within the LVBP-ROI can include calculating the highest amount of radiotracer activity within the LVBP-ROI. The maximal radiotracer count can be expressed in any suitable units, such as counts/pixel.

At block 210, the abnormal myocardial activity threshold can be calculated using the maximal radiotracer count within the LVBP-ROI from block 208. In some cases, calculating the abnormal myocardial activity threshold can include applying the maximal radiotracer count within the LVBP-ROI to an equation or a machine-learning algorithm. In some cases, the abnormal myocardial activity threshold can be defined as a certain percentage of the maximal radiotracer count within the LVBP-ROI, such as 150%. In some cases, other percentages can be used, such as 125%, 126%, 127%, 128%, 129%, 130%, 131%, 132%, 133%, 134%, 135%, 136%, 137%, 138%, 139%, 140%, 141%, 142%, 143%, 144%, 145%, 146%, 147%, 148%, 149%, 151%, 152%, 153%, 154%, 155%, 156%, 157%, 158%, 159%, 160%, 161%, 162%, 163%, 164%, 165%, 166%, 167%, 168%, 169%, 170%, 171%, 172%, 173%, 174%, and/or 175%.

At block 212, a myocardium region of interest can be identified. Identifying the myocardium region of interest (myocardium ROI) can be performed manually or automatically. Identifying the myocardium region of interest can include manually or automatically defining the boundaries of the left and right ventricular myocardium. A polygonal region of interest can be used to define the boundaries of the left and right ventricular myocardium while excluding adjacent ribs and any other tissue that is to be excluded. Manually defining the region can include placing and moving the edges and vertices of the region using a user interface, such as using a keyboard and/or mouse. Automatically defining the region of interest can include automatically detecting, using the imaging data, estimated boundaries of the left and right ventricular myocardium. In some cases, automatically defining the myocardium region of interest can include processing the imaging data using a machine-learning algorithm trained to identify the myocardium region of interest (e.g., a myocardium region of interest most useful in generating a CPA value that is useful for diagnosing ATTR-CM). In some cases, automatically defining the myocardium region of interest can include applying an image processing algorithm to the imaging data to identify regions of the imaging data likely to be the myocardium region of interest.

At block 214, region(s) of abnormal myocardial activity within the myocardium ROI are detected. The radiotracer activity within the myocardium ROI from block 212 can be compared to the abnormal myocardial activity threshold from block 204. When the threshold is exceeded, that region can be identified as having abnormal myocardial activity. The region(s) of abnormal myocardial activity can be voxels or groups of voxels within the imaging data.

At block 216, a VOI can be determined using the region(s) of abnormal myocardial activity from block 214. The VOI can be a quantification of the volume of the myocardium ROI that is identified as being a region of abnormal myocardial activity. In other words, the VOI can equal the volume of a single voxel multiplied by the number of voxels that have radiotracer activity counts over the abnormal myocardial activity threshold.

At block 218, a mean radiotracer activity count for the region(s) of abnormal myocardial activity is calculated. The mean radiotracer activity count can be calculated as the sum of all radiotracer activity counts that exceed the abnormal myocardial activity threshold divided by the number of voxels having a radiotracer activity count exceeding the abnormal myocardial activity threshold.

At block 220, a CPA value can be calculated. The CPA value can be calculated using the VOI from block 216 and the mean radiotracer activity count from block 218. The CPA can be directly proportional to the VOI multiplied by the mean radiotracer activity count. In some cases, the CPA can be calculated as the VOI, multiplied by the mean radiotracer activity count divided by the maximal radiotracer count within the LVBP-ROI from block 208. For example, the CPA can be calculated according to the following equation:

$$CPA = VOIx \frac{\text{mean radiotracer activity counts of regions with abnormal myocardial activity}}{\text{maximal } LVBP \text{ radiotracer activity}}$$

In some cases, the CPA value can be expressed as a dimensionless value.

The CPA value can be useful in evaluating and diagnosing ATTR-CM. For example, larger CPA values are indicative of a greater risk or likelihood of ATTR-CM.

At optional block 224, the CPA value can be presented in association with the imaging data. Presenting can include presenting to a user or patient in any discernable fashion. In some cases, presenting the imaging data can include presenting the imaging data as one or more static, dynamic, and/or interactive images on a display. Presenting the CPA value can include presenting the numerical value of the CPA value itself and/or presenting a categorical value associated with the CPA value (e.g., a "low," "medium," or "high" risk or likelihood of ATTR-CM, as defined by threshold CPA values). In some cases, presenting a CPA value can include presenting historical CPA values of the same patient. In some cases, presenting a CPA value can include presenting example CPA values of other patients having similarities to the patient.

While described with a particular set of blocks in a particular order, in some cases process 200 can include fewer blocks or additional blocks, in any suitable order. For example, blocks 204 and 212 can occur simultaneously or in different orders, as well as blocks 216 and 218. In another example, process 200 can stop at block 216 and the VOI can be output for the use of evaluating cardiac amyloidosis without necessarily further calculating CPA.

Figure 3:
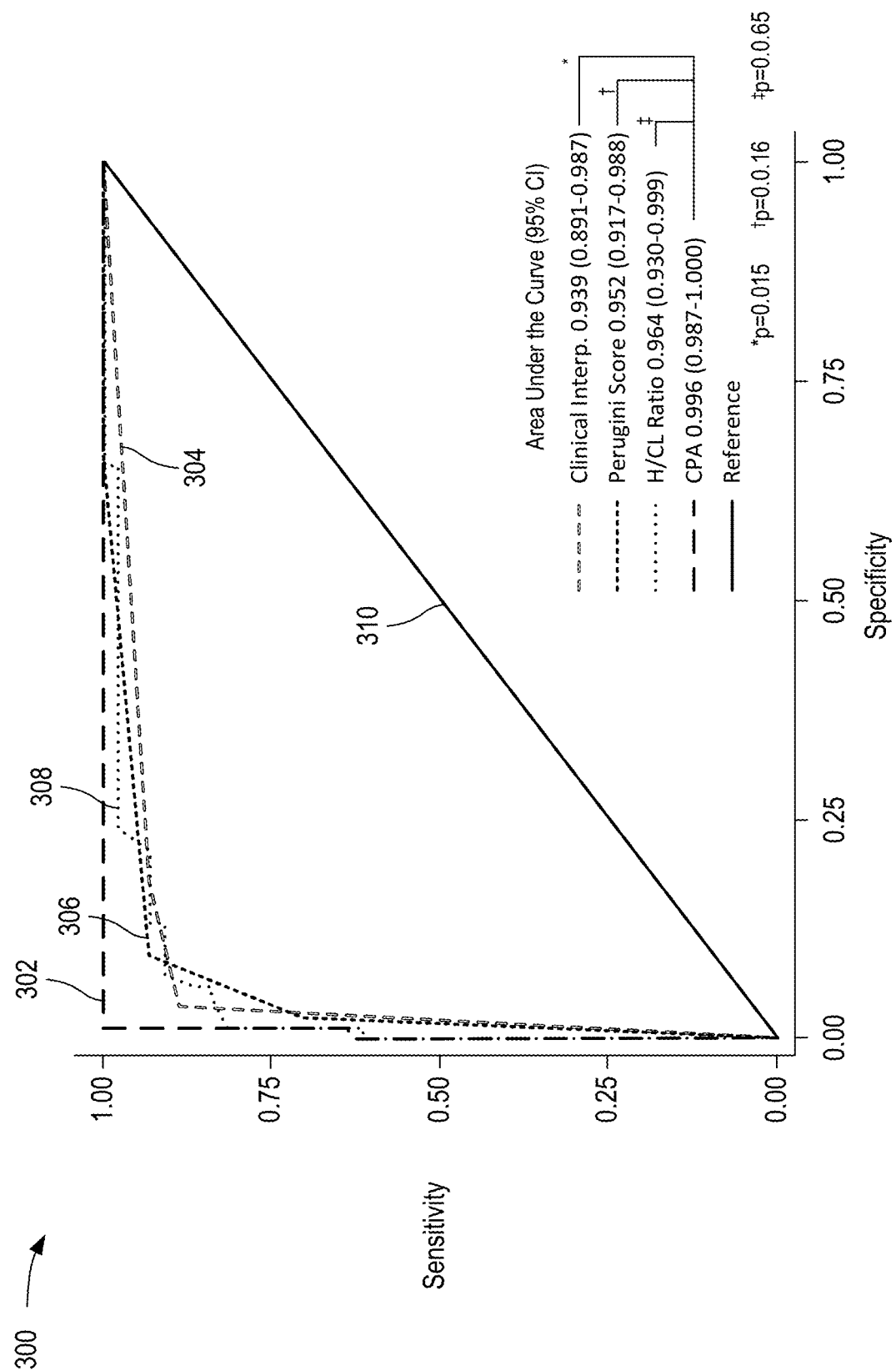
FIG. 3 is a chart depicting a receiver operating characteristics (ROC) curve for detection of transthyretin amyloid cardiomyopathy using cardiac pyrophosphate activity values, according to certain aspects of the present disclosure.

FIG. 3 is a chart 300 depicting a receiver operating characteristics (ROC) curve for detection of ATTR-CM using cardiac pyrophosphate activity values, according to certain aspects of the present disclosure. Chart 300 depicts the diagnostic accuracy for CPA values, Clinical interpretation, Perugini Score, and H/CL ratio at respective lines 302, 304, 306, 308. A reference line 310 is added for 1:1 specificity and sensitivity. As depicted in chart 300, the CPA value performs much better than the other parameters previously used to evaluate ATTR-CM.

CPA had the highest area under the curve (AUC 0.996, 95% CI 0.987-1.00) and was significantly higher compared to overall clinical interpretation (AUC 0.925, 95% CI 0.874-0.977, p=0.006) or the Perugini score (AUC 0.952, 95% CI 0.917-0.988, p=0.016). H/CL ratio had similar area under the curve (AUC 0.964, 95% CI 0.930-0.999) to CPA (p=0.065). SPECT visual interpretation had similar area under the curve to CPA (AUC 0.994, 95% CI 0.982-1.00, p=0.379) and was also superior to clinical interpretation (p=0.020).

Figure 4:
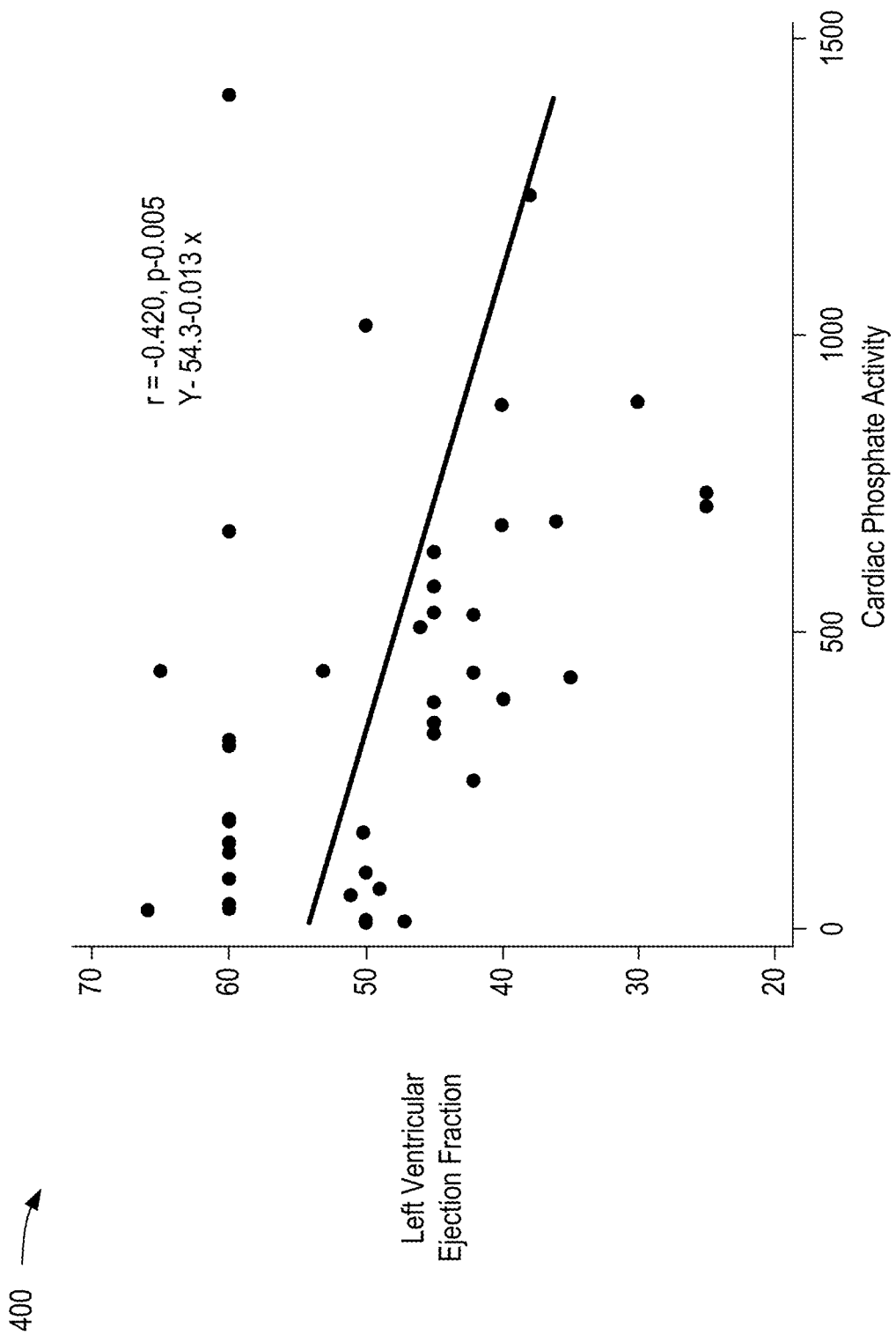
FIG. 4 is a chart depicting correlation of cardiac phosphate activity and left ventricular ejection fraction in patients with transthyretin cardiac amyloidosis, according to certain aspects of the present disclosure.

FIG. 4 is a chart 400 depicting correlation of cardiac phosphate activity and left ventricular ejection fraction in patients with transthyretin cardiac amyloidosis, according to certain aspects of the present disclosure. As seen in chart 400, CPA values show a useful correlation with LVEF. Increased CPA values are a good indication of decreases in LVEF.

Figure 5:
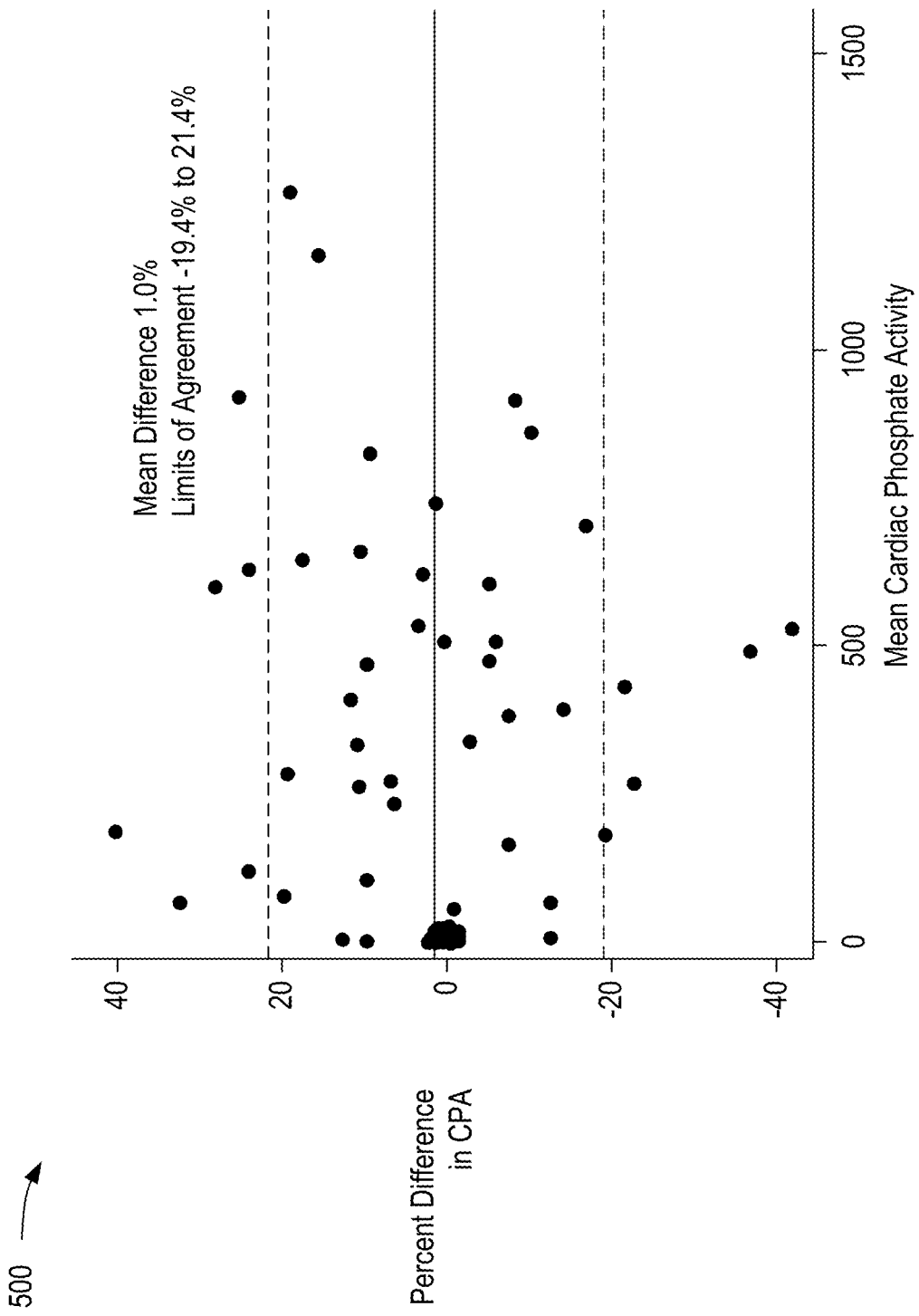
FIG. 5 is a difference plot depicting interobserver variability in cardiac pyrophosphate activity measurement, according to certain aspects of the present disclosure.

FIG. 5 is a difference plot 500 depicting interobserver variability in cardiac pyrophosphate activity measurement, according to certain aspects of the present disclosure. As seen in the difference plot 500, the interobserver variability in CPA measurement is relatively low overall. Additionally, the agreement on absence of activity by CPA is excellent.

Figure 6:
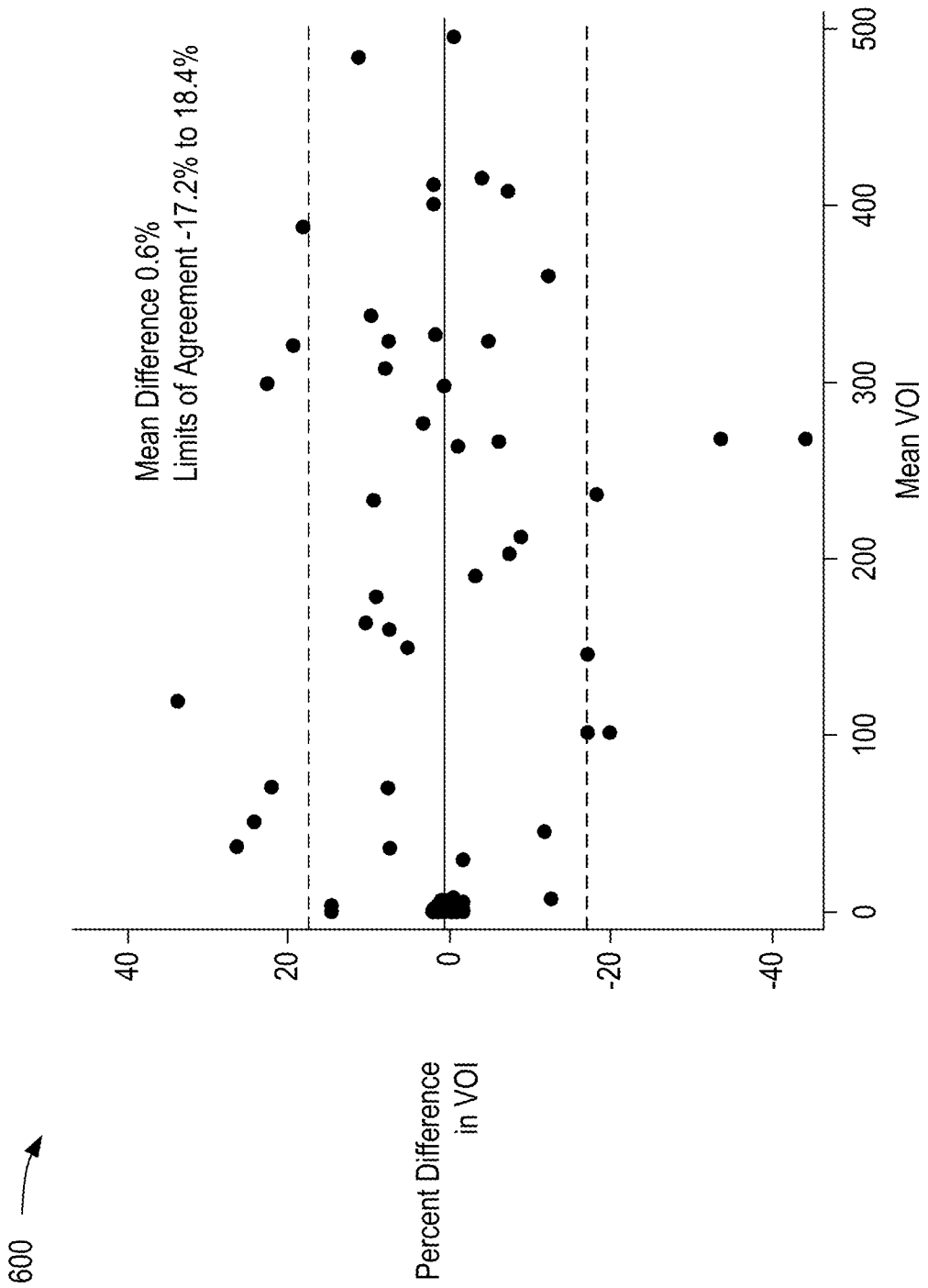
FIG. 6 is a difference plot depicting interobserver variability in volume of involvement measurement, according to certain aspects of the present disclosure.

FIG. 6 is a difference plot 600 depicting interobserver variability in volume of involvement measurement, according to certain aspects of the present disclosure. As seen in the difference plot 600, the interobserver variability in VOI measurement is relatively low overall. Additionally, the agreement on absence of activity by VOI is excellent.

Figure 7:
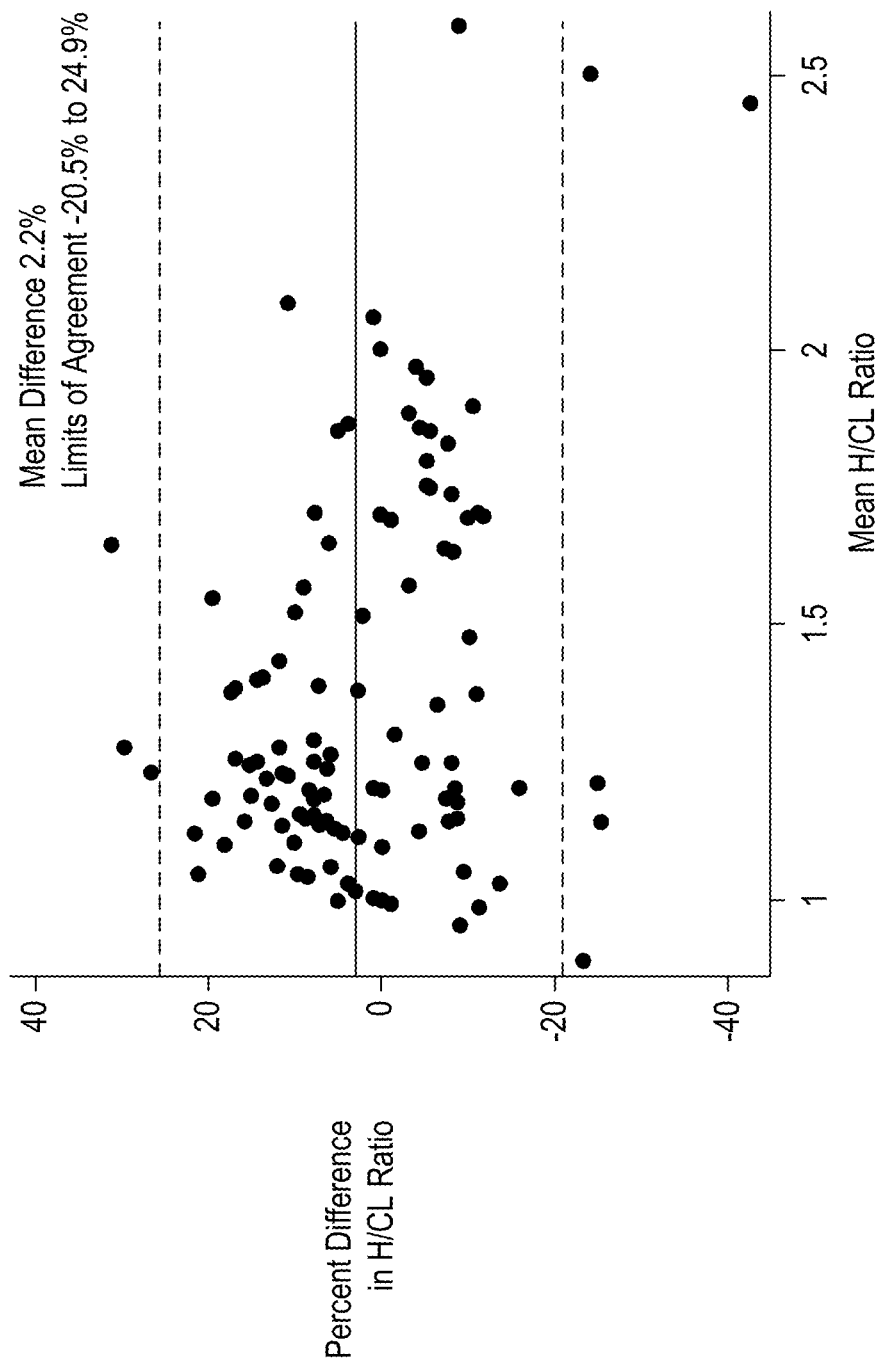
FIG. 7 is a difference plot depicting interobserver variability in heart-contralateral ratio measurement.

FIG. 7 is a difference plot 700 depicting interobserver variability in heart-contralateral ratio measurement. As seen in the difference plot 700, the interobserver variability in H/CL measurement is only moderate, and does not show great agreement on absence of activity.

Comparison of difference plots 500, 600, and 700 of FIGS. 5-7 show that the use of CPA and VOI measurements can provide more reliable and repeatable results than the use of H/CL measurement. Interobserver variability for CPA (mean difference 1.0%, limits of agreement −19.4% to 21.4%) and VOI (mean difference 0.6%, limits of agreement −17.2% to 18.4%) were low, and comparable to H/CL ratio (mean difference 2.2%, limits of agreement −20.5% to 24.9%). Agreement on absence of activity by CPA and VOI were excellent (kappa=1.00).

Figure 8:
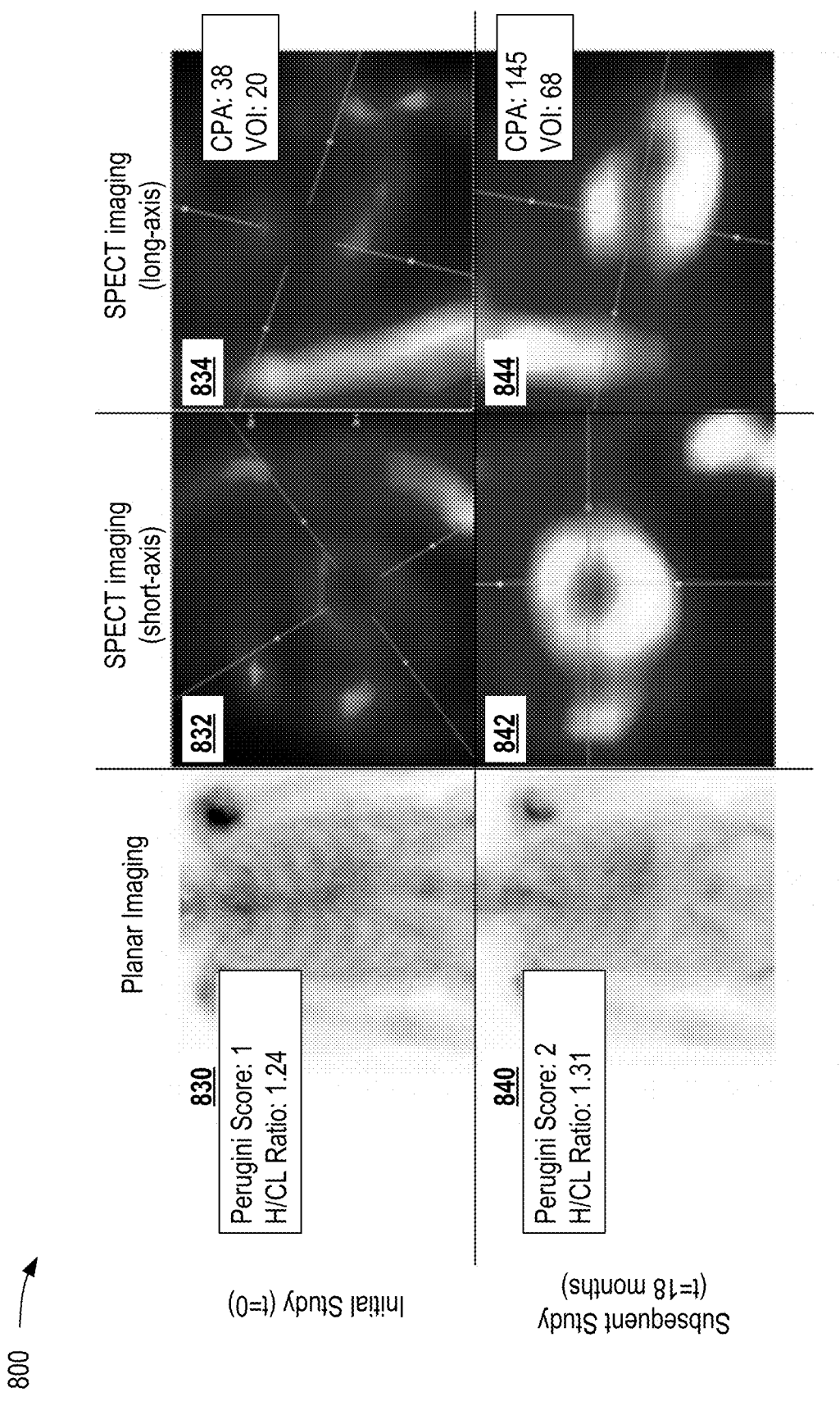
FIG. 8 is a combination image depicting imaging data from an example patient comparing an initial study to a subsequent study, according to certain aspects of the present disclosure.

FIG. 8 is a combination image 800 depicting imaging data from an example patient comparing an initial study to a subsequent study, according to certain aspects of the present disclosure. Combination image 800 includes six images 830, 832, 834, 840, 842, 844 representative of imaging data acquired from a single patient. Images 830, 832, 834 were acquired during an initial study, denoted as time 0 (e.g., t=0). Images 840, 842, 844 were acquired during a subsequent study 18 months after the initial study. The patient associated with combination image 800 was ultimately diagnosed with ATTR-CM by endomyocardial biopsy after the subsequent study.

Images 830, 840 are planar images of the individual at time t=0 and time t=18 months, respectively. Images 832, 842 are short-axis SPECT images of the individual at time t=0 and time t=18 months, respectively. Images 834, 844 are long-axis SPECT images of the individual at time t=0 and time t=18 months, respectively.

From the image data, Perugini Scores, H/CL Ratios, CPA values, and VOI values were obtained at time t=0 and time t=18 months. At time t=0, the Perugini Score was 1, the H/CL ratio was 1.24, the CPA was 38, and the VOI was 20. At time t=18, the Perugini Score was 2, the H/CL ratio was 1.31, the CPA was 145, and the VOI was 68. In this individual, who was ultimately diagnosed with ATTR-CM, the Perugini Score and H/CL Ratio both increased in the 18-month window, but only moderately. By contrast, the CPA and VOI values increased more substantially during that time period. The use of CPA and VOI values for the evaluation of ATTR-CM may be able to provide earlier diagnosis than when other parameters are used.

Figure 9:
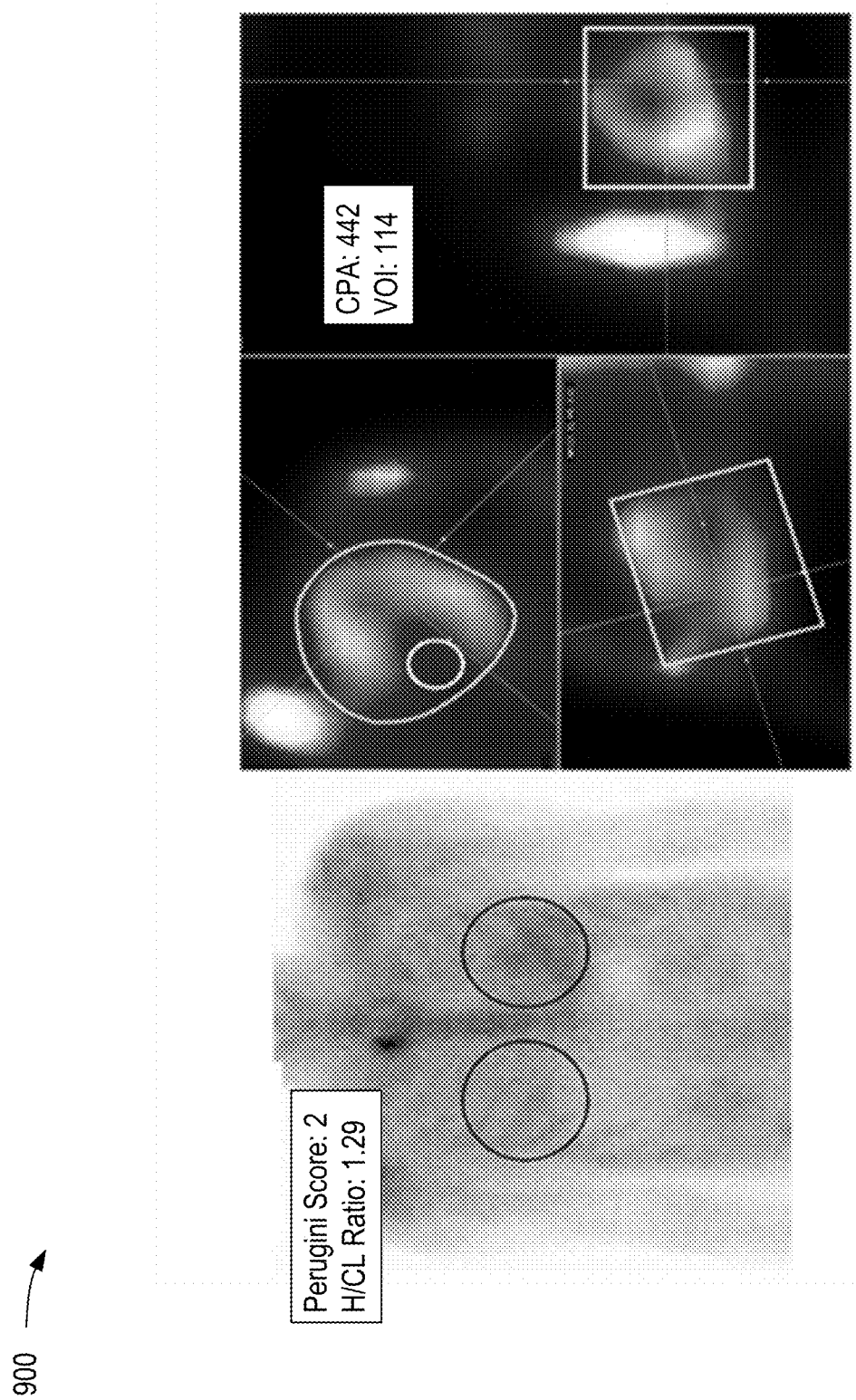
FIG. 9 is a combination image depicting imaging data from a patient diagnosed with transthyretin amyloid cardiomyopathy, according to certain aspects of the present disclosure.

FIG. 9 is a combination image 900 depicting imaging data from a patient diagnosed with ATTR-CM, according to certain aspects of the present disclosure. Combination image 900 includes four sub-images of image data collected from a single patient who was eventually diagnosed with ATTR-CM. The planar imaging was graded visually with a Perugini Score of 2 and an H/CL ratio of 1.29. Quantitative analysis was positive, with confirmation of radiotracer in the LV myocardium more than blood pool. The patient had an endomyocardial biopsy confirming ATTR-CM after the $^{99m}$Tc-pyrophosphate study was reported as equivocal. CPA and VOI were calculated according to process 200 of FIG. 2. The CPA was calculated to be 442 and the VOI was calculated to be 114. The CPA and VOI correlate with a conclusion that the patient may be suffering from ATTR-CM.

Figure 10:
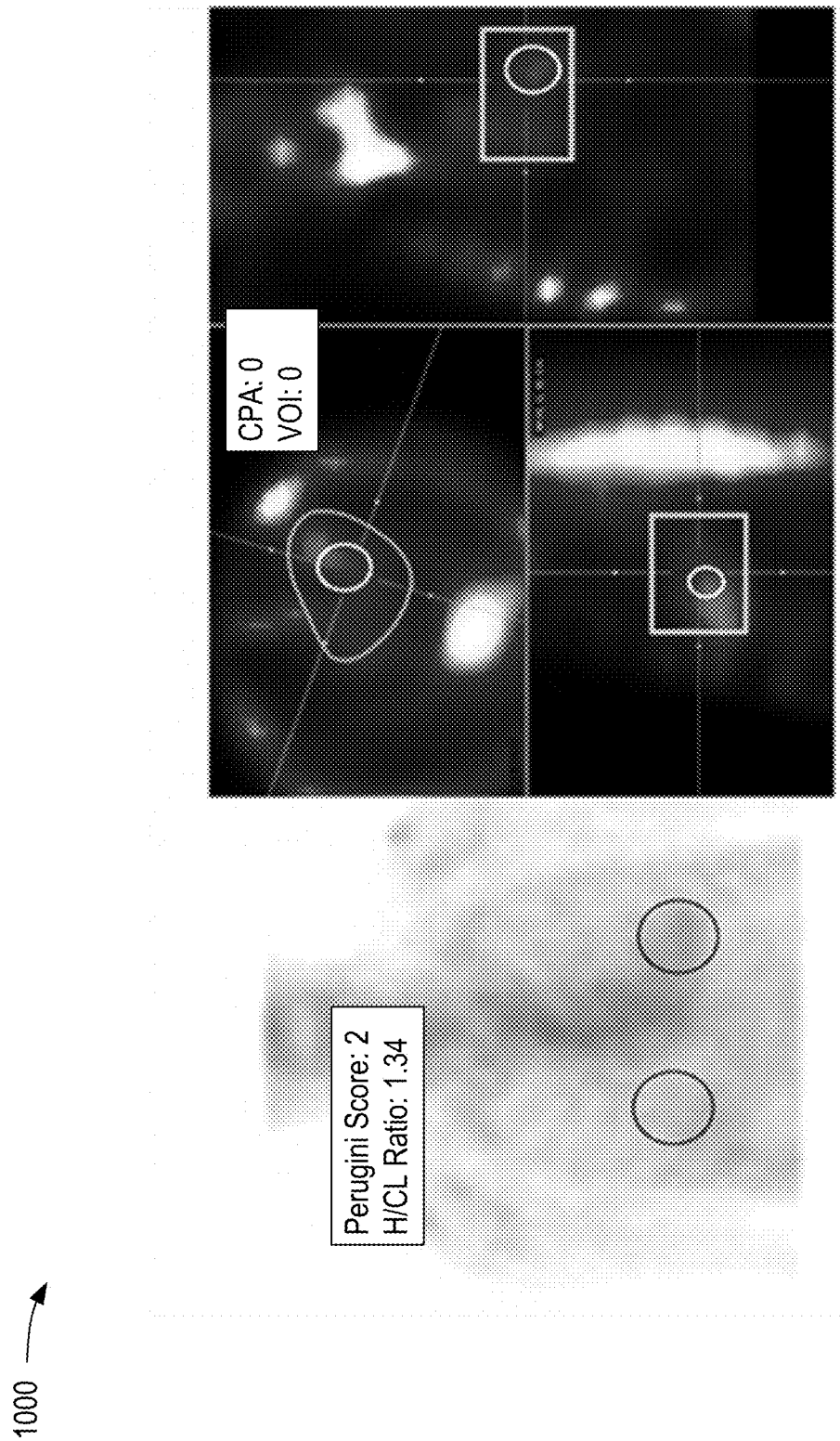
FIG. 10 is a combination image depicting imaging data from a patient diagnosed with amyloid light-chain amyloidosis, according to certain aspects of the present disclosure.

FIG. 10 is a combination image 1000 depicting imaging data from a patient diagnosed with amyloid light-chain (AL) amyloidosis, according to certain aspects of the present disclosure. Combination image 1000 includes four sub-images of image data collected from a single patient who was eventually diagnosed with AL amyloidosis, and not ATTR-CM.

The planar imaging was graded visually with a Perugini Score of 2 and an H/CL ratio of 1.34. Current literature suggests that a H/CL greater than 1.3 is indicative of ATTR-CM, and a Perugini Score of 2 indicates that the cardiac update has an intensity that is similar to or greater than the bone uptake. Therefore, based solely on the Perugini Score and the H/CL ratio, one may incorrectly conclude that the patient is suffering from ATTR-CM. However, examination of the SPECT imaging confirmed that the radiotracer activity was in the left ventricular blood pool, thus resulting in a CPA and VOI of 0, as calculated according to process 200 of FIG. 2. Thus, despite a higher Perugini Score and H/CL ratio, the CPA and VOI correlated with a conclusion that the patient was not suffering from ATTR-CM.

Figure 11:
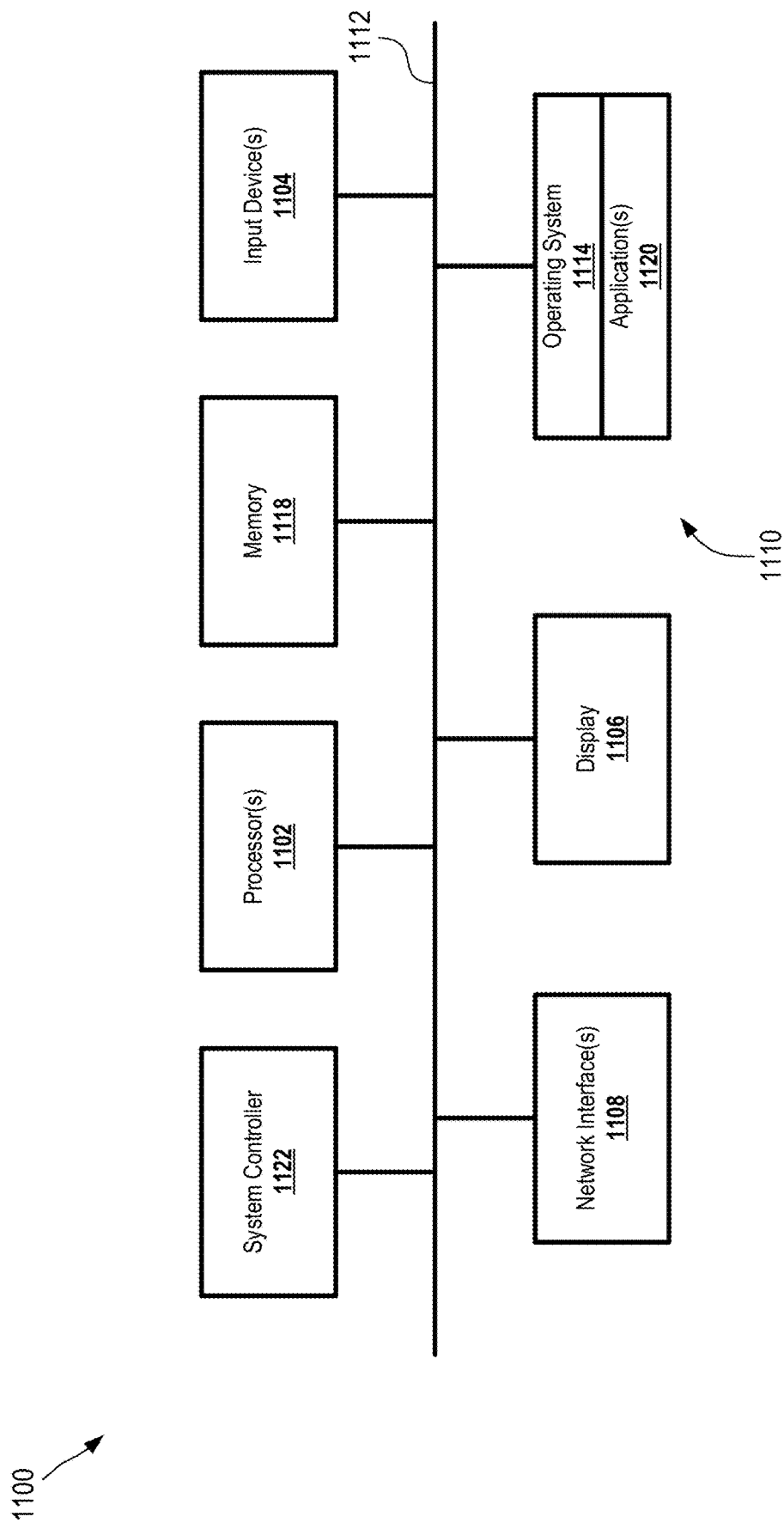
FIG. 11 is a block diagram depicting an example system architecture for implementing certain features and processes of the present disclosure.

FIG. 11 is a block diagram of an example system architecture 1100 for implementing features and processes of the present disclosure, such as those presented with reference to FIG. 2. The system architecture 1100 can be used to implement any suitable computing device (e.g., a server, workstation, tablet, radiotracer scanner, imaging data processing module, or other such device) for practicing the various features and processes of the present disclosure. The system architecture 1100 can be implemented on any electronic device that runs software applications derived from compiled instructions, including without limitation personal computers, servers, smart phones, electronic tablets, game consoles, email devices, and the like. In some implementations, the system architecture 1100 can include one or more processors 1102, one or more input devices 1104, one or more display devices 1106, one or more network interfaces 1108, and one or more computer-readable mediums 1110. Each of these components can be coupled by bus 1112.

In some cases, system architecture 1100 can be incorporated into a computing system capable of performing SPECT imaging, such as a computing system used to control a gamma camera or other SPECT imaging equipment. In some cases, system architecture 1100 can be incorporated into a workstation computer used primarily for viewing and interpreting imaging data, such as a workstation located in the office of a medical professional interpreting the imaging data acquired at a different location (e.g., a different facility).

Display device 1106 can be any known display technology, including but not limited to display devices using Liquid Crystal Display (LCD) or Light Emitting Diode (LED) technology. Processor(s) 1102 can use any known processor technology, including but not limited to graphics processors and multi-core processors. Input device 1104 can be any known input device technology, including but not limited to a keyboard (including a virtual keyboard), mouse, track ball, and touch-sensitive pad or display. Bus 1112 can be any known internal or external bus technology, including but not limited to ISA, EISA, PCI, PCI Express, NuBus, USB, Serial ATA or FireWire.

Computer-readable medium 1110 can be any medium that participates in providing instructions to processor(s) 1102 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 1110 can include various instructions for implementing operating system 1114 and applications 1120 such as computer programs. The operating system can be multi-user, multiprocessing, multitasking, multithreading, real-time and the like. The operating system 1114 performs basic tasks, including but not limited to: recognizing input from input device 1104; sending output to display device 1106; keeping track of files and directories on computer-readable medium 1110; controlling peripheral devices (e.g., disk drives, printers, etc.) which can be controlled directly or through an I/O controller; and managing traffic on bus 1112. Computer-readable medium 1110 can include various instructions for implementing firmware processes, such as a BIOS. Computer-readable medium 1110 can include various instructions for implementing any of processes described herein, including at least process 200 of FIG. 2.

Memory 1118 can include high-speed random access memory and/or non-volatile memory, such as one or more magnetic disk storage devices, one or more optical storage devices, and/or flash memory (e.g., NAND, NOR). The memory 1118 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 1118 can store an operating system, such as Darwin, RTXC, LINUX, UNIX, OS X, WINDOWS, or an embedded operating system such as VxWorks.

System controller 1122 can be a service processor that operates independently of processor 1102. In some implementations, system controller 1122 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java, Python), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

As used below, any reference to a series of examples is to be understood as a reference to each of those examples disjunctively (e.g., "Examples 1-4" is to be understood as "Examples 1, 2, 3, or 4").

Example 1 is a system, comprising: one or more data processors; and a non-transitory computer-readable storage medium containing instructions which, when executed on the one or more data processors, cause the one or more data processors to perform operations including: receiving imaging data of a heart, wherein the imaging data is indicative of radiotracer uptake in tissue; determining an abnormal myocardial activity threshold using the imaging data; identifying a myocardium region of interest in the imaging data; identifying one or more regions of abnormal myocardial activity within the myocardium region of interest, wherein each of the one or more regions of abnormal myocardial activity has radiotracer activity greater than the abnormal myocardial activity threshold; determining a volume of involvement associated with the identified one or more regions of abnormal myocardial activity; calculating a mean radiotracer activity count for the one or more regions of abnormal myocardial activity; and calculating a cardiac pyrophosphate activity value using the volume of involvement and the mean radiotracer activity count.

Example 2 is the system of example(s) 1, wherein the radiotracer is $^{99m}$Technetium-pyrophosphate and the imaging data is acquired from a single-photon emission computed tomography scanner.

Example 3 is the system of example(s) 1 or 2, wherein determining the abnormal myocardial activity threshold includes: identifying a left ventricular blood pool region of interest (LVBP-ROI) in the imaging data; identifying a maximal radiotracer count within the LVBP-ROI; and calculating the abnormal myocardial activity threshold using the maximal radiotracer count within the LVBP-ROI.

Example 4 is the system of example(s) 3, wherein calculating the abnormal myocardial activity threshold using the maximal radiotracer count within the left ventricular blood pool region of interest includes calculating the abnormal myocardial activity threshold as a percentage of the maximal radiotracer count within the left ventricular blood pool region of interest, wherein the percentage is between 125% and 175%.

Example 5 is the system of example(s) 3 or 4, wherein calculating the cardiac pyrophosphate activity value further uses the maximal radiotracer count within the left ventricular blood pool region of interest.

Example 6 is the system of example(s) 5, wherein the cardiac pyrophosphate activity value (CPA) is calculated using the equation $$CPA = \text{Volume of Involvement} \times \frac{\text{mean radiotracer activity count}}{\text{maximal radiotracer count within the } LVBP-ROI}.$$

Example 7 is the system of example(s) 1-6, further comprising a display device, wherein the operations further include: presenting the imaging data on the display device; and presenting the cardiac pyrophosphate activity value on the display device in association with the imaging data, wherein the cardiac pyrophosphate activity value is usable to assess a risk of transthyretin amyloid cardiomyopathy.

Example 8 is a computer-implemented method, comprising: receiving imaging data of a heart, wherein the imaging data is indicative of radiotracer uptake in tissue; determining an abnormal myocardial activity threshold using the imaging data; identifying a myocardium region of interest in the imaging data; identifying one or more regions of abnormal myocardial activity within the myocardium region of interest, wherein each of the one or more regions of abnormal myocardial activity has radiotracer activity greater than the abnormal myocardial activity threshold; determining a volume of involvement associated with the identified one or more regions of abnormal myocardial activity; calculating a mean radiotracer activity count for the one or more regions of abnormal myocardial activity; and calculating a cardiac pyrophosphate activity value using the volume of involvement and the mean radiotracer activity count.

Example 9 is the method of example(s) 8, wherein the radiotracer is $^{99m}$Technetium-pyrophosphate and the imaging data is acquired from a single-photon emission computed tomography scanner.

Example 10 is the method of example(s) 8 or 9, wherein determining the abnormal myocardial activity threshold includes: identifying a left ventricular blood pool region of interest (LVBP-ROI) in the imaging data; identifying a maximal radiotracer count within the LVBP-ROI; and calculating the abnormal myocardial activity threshold using the maximal radiotracer count within the LVBP-ROI.

Example 11 is the method of example(s) 10, wherein calculating the abnormal myocardial activity threshold using the maximal radiotracer count within the left ventricular blood pool region of interest includes calculating the abnormal myocardial activity threshold as a percentage of the maximal radiotracer count within the left ventricular blood pool region of interest, wherein the percentage is between 125% and 175%.

Example 12 is the method of example(s) 10 or 11, wherein calculating the cardiac pyrophosphate activity value further uses the maximal radiotracer count within the left ventricular blood pool region of interest.

Example 13 is the method of example(s) 12, wherein the cardiac pyrophosphate activity value (CPA) is calculated using the equation $$CPA = \text{Volume of Involvement} \times \frac{\text{mean radiotracer activity count}}{\text{maximal radiotracer count within the } LVBP-ROI}.$$

Example 14 is the method of example(s) 8-13, further including: presenting the imaging data on a display device; and presenting the cardiac pyrophosphate activity value on the display device in association with the imaging data, wherein the cardiac pyrophosphate activity value is usable to assess a risk of transthyretin amyloid cardiomyopathy.

Example 15 is a computer-program product tangibly embodied in a non-transitory machine-readable storage medium, including instructions configured to cause a data processing apparatus to perform operations including: receiving imaging data of a heart, wherein the imaging data is indicative of radiotracer uptake in tissue; determining an abnormal myocardial activity threshold using the imaging data; identifying a myocardium region of interest in the imaging data; identifying one or more regions of abnormal myocardial activity within the myocardium region of interest, wherein each of the one or more regions of abnormal myocardial activity has radiotracer activity greater than the abnormal myocardial activity threshold; determining a volume of involvement associated with the identified one or more regions of abnormal myocardial activity; calculating a mean radiotracer activity count for the one or more regions of abnormal myocardial activity; and calculating a cardiac pyrophosphate activity value using the volume of involvement and the mean radiotracer activity count.

Example 16 is the computer-program product of example(s) 15, wherein the radiotracer is $^{99m}$Technetium-pyrophosphate and the imaging data is acquired from a single-photon emission computed tomography scanner.

Example 17 is the computer-program product of example(s) 15 or 16, wherein determining the abnormal myocardial activity threshold includes: identifying a left ventricular blood pool region of interest (LVBP-ROI) in the imaging data; identifying a maximal radiotracer count within the LVBP-ROI; and calculating the abnormal myocardial activity threshold using the maximal radiotracer count within the LVBP-ROI.

Example 18 is the computer-program product of example(s) 17, wherein calculating the abnormal myocardial activity threshold using the maximal radiotracer count within the left ventricular blood pool region of interest includes calculating the abnormal myocardial activity threshold as a percentage of the maximal radiotracer count within the left ventricular blood pool region of interest, wherein the percentage is between 125% and 175%.

Example 19 is the computer-program product of example(s) 17 or 18, wherein calculating the cardiac pyrophosphate activity value further uses the maximal radiotracer count within the left ventricular blood pool region of interest.

Example 20 is the computer-program product of example(s) 19, wherein the cardiac pyrophosphate activity value (CPA) is calculated using the equation $$CPA = \text{Volume of Involvement} \times \frac{\text{mean radiotracer activity count}}{\text{maximal radiotracer count within the } LVBP-ROI}.$$

Example 21 is the computer-program product of example(s) 15-20, wherein the operations further include: presenting the imaging data on a display device; and presenting the cardiac pyrophosphate activity value on the display device in association with the imaging data, wherein the cardiac pyrophosphate activity value is usable to assess a risk of transthyretin amyloid cardiomyopathy.

What is claimed is:

1. A system, comprising:
a radio tracer injector;
an image scanner operable to sense imaging data of a heart;
one or more data processors coupled to the radio tracer injector and the image scanner; and
a non-transitory computer-readable storage medium containing instructions which, when executed on the one or more data processors, cause the one or more data processors to perform operations including:
controlling the radio tracer injector to inject a radio tracer in a patient;
activating the image scanner to sense imaging data of a heart;
receiving imaging data of a heart, wherein the imaging data is indicative of a radiotracer uptake in tissue;
determining an abnormal myocardial activity threshold using the imaging data;
identifying a myocardium region of interest in the imaging data;
identifying one or more regions of abnormal myocardial activity within the myocardium region of interest, wherein each of the one or more regions of abnormal myocardial activity has a radiotracer activity greater than the abnormal myocardial activity threshold;
determining a volume of involvement associated with the identified one or more regions of abnormal myocardial activity;
calculating a mean radiotracer activity count for the one or more regions of abnormal myocardial activity; and
calculating a cardiac pyrophosphate activity value using the volume of involvement and the mean radiotracer activity count;
determining a risk of Transthyretin amyloid cardiomyopathy (ATTR-CM) of the heart based on the cardiac pyrophosphate activity value; and
controlling a treatment system to apply a treatment for ATTR-CM from the group consisting of liver transplantation, a therapy stabilizing misfolded transthyretin precursor, or Tafamadis based on the determined risk.

2. The system of claim 1, wherein the radiotracer is $^{99m}$Technetium-pyrophosphate and the image scanner is a single-photon emission computed tomography scanner.

3. The system of claim 1, wherein determining the abnormal myocardial activity threshold includes:
identifying a left ventricular blood pool region of interest (LVBP-ROI) in the imaging data;
identifying a maximal radiotracer count within the LVBP-ROI; and
calculating the abnormal myocardial activity threshold using the maximal radiotracer count within the LVBP-ROI.

4. The system of claim 3, wherein calculating the abnormal myocardial activity threshold using the maximal radiotracer count within the left ventricular blood pool region of interest includes calculating the abnormal myocardial activity threshold as a percentage of the maximal radiotracer count within the left ventricular blood pool region of interest, wherein the percentage is between 125% and 175%.

5. The system of claim 3, wherein calculating the cardiac pyrophosphate activity value further uses the maximal radiotracer count within the left ventricular blood pool region of interest.

6. The system of claim 5, wherein the cardiac pyrophosphate activity value (CPA) is calculated using the equation $$CPA = \text{Volume of Involvement} \times \frac{\text{mean radiotracer activity count}}{\text{maximal radiotracer count within the } LVBP-ROI}.$$

7. The system of claim 1, further comprising a display device, wherein the operations further include:
  presenting the imaging data on the display device; and
  presenting the cardiac pyrophosphate activity value on the display device in association with the imaging data and the risk of transthyretin amyloid cardiomyopathy.

8. A method, comprising:
  injecting a radiotracer in tissue;
  receiving imaging data of a heart from an image scanner, wherein the imaging data is indicative of a radiotracer uptake in tissue;
  determining an abnormal myocardial activity threshold using the imaging data;
  identifying a myocardium region of interest in the imaging data;
  identifying one or more regions of abnormal myocardial activity within the myocardium region of interest, wherein each of the one or more regions of abnormal myocardial activity has a radiotracer activity greater than the abnormal myocardial activity threshold;
  determining a volume of involvement associated with the identified one or more regions of abnormal myocardial activity via a data processor;
  calculating a mean radiotracer activity count for the one or more regions of abnormal myocardial activity via the data processor;
  calculating a cardiac pyrophosphate activity value using the volume of involvement and the mean radiotracer activity count via the data processor;
  determining a risk of Transthyretin amyloid cardiomyopathy (ATTR-CM) of the heart based on the cardiac pyrophosphate activity value; and
  applying a treatment for ATTR-CM from the group consisting of liver transplantation, a therapy stabilizing misfolded transthyretin precursor, or treatment with Tafamadis based on the determined risk.

9. The method of claim 8, wherein the radiotracer is $^{99m}$Technetium-pyrophosphate and the image scanner is a single-photon emission computed tomography scanner.

10. The method of claim 8, wherein determining the abnormal myocardial activity threshold includes:
  identifying a left ventricular blood pool region of interest (LVBP-ROI) in the imaging data;
  identifying a maximal radiotracer count within the LVBP-ROI; and
  calculating the abnormal myocardial activity threshold using the maximal radiotracer count within the LVBP-ROI.

11. The method of claim 10, wherein calculating the abnormal myocardial activity threshold using the maximal radiotracer count within the left ventricular blood pool region of interest includes calculating the abnormal myocardial activity threshold as a percentage of the maximal radiotracer count within the left ventricular blood pool region of interest, wherein the percentage is between 125% and 175%.

12. The method of claim 10, wherein calculating the cardiac pyrophosphate activity value further uses the maximal radiotracer count within the left ventricular blood pool region of interest.

13. The method of claim 12, wherein the cardiac pyrophosphate activity value (CPA) is calculated using the equation $$CPA = \text{Volume of Involvement} \times \frac{\text{mean radiotracer activity count}}{\text{maximal radiotracer count within the } LVBP-ROI}.$$

14. The method of claim 8, further including:
  presenting the imaging data on a display device; and
  presenting the cardiac pyrophosphate activity value on the display device in association with the imaging data and the risk of transthyretin amyloid cardiomyopathy.

15. A non-transitory computer readable medium comprising a data processing apparatus with a computer program product that, when executed, performs operations including:
  receiving imaging data of a heart, wherein the imaging data is indicative of a radiotracer uptake in tissue;
  determining an abnormal myocardial activity threshold using the imaging data;
  identifying a myocardium region of interest in the imaging data;
  identifying one or more regions of abnormal myocardial activity within the myocardium region of interest, wherein each of the one or more regions of abnormal myocardial activity has a radiotracer activity greater than the abnormal myocardial activity threshold;
  determining a volume of involvement associated with the identified one or more regions of abnormal myocardial activity;
  calculating a mean radiotracer activity count for the one or more regions of abnormal myocardial activity;
  calculating a cardiac pyrophosphate activity value using the volume of involvement and the mean radiotracer activity count;
  determining a risk of Transthyretin amyloid cardiomyopathy (ATTR-CM) of the heart based on the cardiac pyrophosphate activity value; and
  controlling a treatment system to apply a treatment for ATTR-CM from the group consisting of liver transplantation, a therapy stabilizing misfolded transthyretin precursor, or Tafamadis based on the determined risk.

16. The non-transitory computer readable medium of claim 15, wherein the radiotracer is $^{99m}$Technetium-pyrophosphate and the imaging data is acquired from a single-photon emission computed tomography scanner.

17. The non-transitory computer readable medium of claim 15, wherein determining the abnormal myocardial activity threshold includes:
  identifying a left ventricular blood pool region of interest (LVBP-ROI) in the imaging data;
  identifying a maximal radiotracer count within the LVBP-ROI; and
  calculating the abnormal myocardial activity threshold using the maximal radiotracer count within the LVBP-ROI.

18. The non-transitory computer readable medium of claim 17, wherein calculating the abnormal myocardial activity threshold using the maximal radiotracer count within the left ventricular blood pool region of interest includes calculating the abnormal myocardial activity threshold as a percentage of the maximal radiotracer count within the left ventricular blood pool region of interest, wherein the percentage is between 125% and 175%.

19. The non-transitory computer readable medium of claim 17, wherein calculating the cardiac pyrophosphate activity value further uses the maximal radiotracer count within the left ventricular blood pool region of interest, and wherein the cardiac pyrophosphate activity value (CPA) is calculated using the equation $$CPA = \text{Volume of Involvement} \times \frac{\text{mean radiotracer activity count}}{\text{maximal radiotracer count within the } LVBP\text{-}ROI}.$$

20. The non-transitory computer readable medium of claim 15, wherein the operations further include:
   presenting the imaging data on a display device; and
   presenting the cardiac pyrophosphate activity value on the display device in association with the imaging data and the risk of transthyretin amyloid cardiomyopathy.

\* \* \* \* \*